(12) United States Patent
Massey et al.

(10) Patent No.: US 6,880,485 B2
(45) Date of Patent: Apr. 19, 2005

(54) SYSTEM AND METHOD FOR CONTROLLING FISH FLOW WITH JET DEVICE

(76) Inventors: James Massey, P.O. Box 427, Ben Nevis Rd., Shaw Island, WA (US) 98286; David Bressler, 20775 Hemlock St. NE., Indianola, WA (US) 98342

( * ) Notice: Subject to any disclaimer, the term of this patent is extended or adjusted under 35 U.S.C. 154(b) by 0 days.

(21) Appl. No.: 10/444,757

(22) Filed: May 23, 2003

(65) Prior Publication Data
US 2004/0244712 A1 Dec. 9, 2004

(51) Int. Cl.$^7$ ............................................ A01K 61/00
(52) U.S. Cl. ...................... 119/220; 119/216
(58) Field of Search ...................... 119/215, 216, 219, 119/220, 201, 203; 43/100, 101, 102, 4; 405/81, 405/82, 83, 98, 92

(56) References Cited

U.S. PATENT DOCUMENTS

| | | | | |
|---|---|---|---|---|
| 4,743,742 A | * | 5/1988 | Espedalen | ................. 235/1 R |
| 5,816,196 A | * | 10/1998 | Webster et al. | ............. 119/228 |
| 6,035,575 A | * | 3/2000 | Hilty | ........................... 43/100 |

FOREIGN PATENT DOCUMENTS

| | | |
|---|---|---|
| EP | 0 258 941 | 3/1988 |
| SE | 200102619 A  * | 2/2002 |

* cited by examiner

*Primary Examiner*—Teri P. Luu
*Assistant Examiner*—T. Nguyen
(74) *Attorney, Agent, or Firm*—Kenyon & Kenyon

(57) ABSTRACT

A system and method for controlling the flow of fish. The system includes a vessel containing water and having an exit aperture. The system also includes a sensor configured to sense a first fish moving through the exit aperture. In addition, the system includes a jet device in communication with the sensor. The jet device is positioned adjacent to the exit aperture and is configured to spray a jet to prevent a second fish from moving through the exit aperture. In one embodiment, the system also includes a gate positioned at the exit aperture, the gate being normally closed and configured to be pushed open by a fish moving through the exit aperture. The system may be employed for providing spacing between fish or may be employed to provide a single fish on demand.

32 Claims, 6 Drawing Sheets

SYSTEM AND METHOD FOR CONTROLLING FISH FLOW WITH JET DEVICE

GOVERNMENT LICENSE RIGHTS

This invention was made with United States Government support under Cooperative Agreement Number 70NANB1H3026 awarded by the National Institute of Standards and Technology (NIST). The United States Government has certain rights in the invention.

FIELD OF THE INVENTION

The present invention relates to a system and method for controlling fish flow. More specifically, the present invention relates to a system and method for using water jets to separate fish moving through an exit aperture of a vessel.

BACKGROUND INFORMATION

In the fields of pisciculture and aquatic resource management, it is often necessary to perform routine fish handling operations on a large number of live fish. Examples of these operations include sorting fish by size, automated vaccinations, and fish tagging/marking. When performing any of these operations, it is typically desirable that the fish be separated from each other. In addition, separating fish may be especially desirable in order to allow fish to be, e.g., automatically or electronically counted. Indeed, automatic fish counting primarily depends upon the separation of individual fish, rather than on their orientation, as they pass a point at which they are detected and counted. Separation between fish is important in automatic counting operations because counting mechanisms may not be able to distinguish between (and therefore accurately count) fish that are overlapped as they move past the counting mechanism.

Various devices are known for handling live fish prior to a given operation. One such type of device are employed to orient live fish prior to a given operation. For instance, U.S. Pat. No. 5,816,196 (hereinafter "the '196 patent") describes a device and method for volitionally orienting fish. The '196 patent is incorporated by reference herein as fully as if set forth in its entirety. FIG. 1 illustrates the device described in the '196 patent. Specifically, FIG. 1 illustrates a vessel 1 with a lower interior surface 2 and an apertured end 3. The apertured end 3 contains an exit aperture 4. The exit aperture 4 is generally of a size slightly wider than the fish to be oriented. The vessel 1 contains water and receives the fish that it are desired to oriented. The supply of fish to be oriented is introduced into the vessel 1 through a supply channel 14, e.g., a supply tank, a net, a second fish handling device, etc. A flow F of water in the vessel 1 is generated in a direction away from the apertured end 3, such as by introducing water through the flow apertures 6 and directed toward the side 9 of the vessel 1 located opposite the apertured end 3. The lower interior surface 2 of the vessel 1 is tilted by placing blocks 15 underneath the lower interior surface 2 proximate to the apertured end 3, so as to facilitate the movement of water in a direction away from the apertured end 3. The flow F away from the apertured end 3 is of sufficient strength so that any fish exiting the vessel 1 through the exit aperture 4 must swim against the flow F in order to pass through the exit aperture 4, thus resulting in the fish having a head-first, dorsal-side-up orientation. The fish are guided towards the exit aperture 4 by slanted walls 7. However, while the device illustrated in FIG. 1, and other conventional fish orienting devices like it, are useful for orienting fish in the head-first, dorsal-side-up orientation, there is still a need to better and more reliably separate the fish.

There are some conventional devices that operate to automatically count fish. For instance, one example of an automatic fish counting mechanism is the "Bioscanner" by Vaki Aquaculture Systems Ltd. of Reykjavik, Iceland. The Bioscanner system includes two acrylic V-shaped channels that are connected to a basin where fish are gathered. Water is pumped into the V-shaped channels from the basin, which is tilted toward the inlets of the channels. The fish in the basin are flushed down the channels. All of the water in this process flows into the channels. At a given distance further down the channels from the channel inlets, the channels narrow to the approximate width of a single fish and curve sharply downward. The effect of the downward curving channels is to accelerate the fish as they pass through the channels, thereby increasing the separation between individual fish or, if the fish were overlapped when they entered the channels, causing the fish to be separated. Counting scanners are located at the bottom of the V-shaped channels and operate to count the fish as they pass by the scanners. However, this and other conventional devices for separating fish do not ensure adequate separation between fish.

Thus, there is a need to provide a system and method for controlling fish flow that ensures adequate separation between fish.

It is therefore an object of the present invention to provide a system and method for controlling fish flow that ensures adequate separation between fish.

SUMMARY OF THE INVENTION

The above and other beneficial objects of the present invention are achieved by providing a system and method as described herein. The present invention, according to one example embodiment thereof, relates to a system for controlling the flow of fish. The system includes a vessel containing water and having an exit aperture. The system also includes a sensor configured to sense a first fish moving through the exit aperture. In addition, the system includes a jet device in communication with the sensor. The jet device is positioned adjacent to the exit aperture and is configured to spray a jet to prevent a second fish from moving through the exit aperture. In one embodiment, the system also includes a gate positioned at the exit aperture, the gate being normally closed and configured to be pushed open by a fish moving through the exit aperture.

In one embodiment, the gate includes a pair of oppositely disposed gate portions, each of which has one end attached to the vessel and a second end that is free to be moved by the fish. The gate portions may be made of a plurality of thin and compliant, e.g., stainless steel, wires. The sensor may be positioned adjacent to the second end of the gate. The jet device may be configured to spray the jet until the sensor senses that the first fish has moved fully through the exit aperture and/or may be configured to spray the jet for a predetermined period of time.

The system may also include a flow generation device for generating a flow in the vessel in a direction away from the exit aperture. In addition, the system may include a fish stimulation device for stimulating fish in the vessel to move through the exit aperture. The system may be employed for providing spacing between fish or may be employed to provide a single fish on demand.

DETAILED DESCRIPTION

Figure 1:
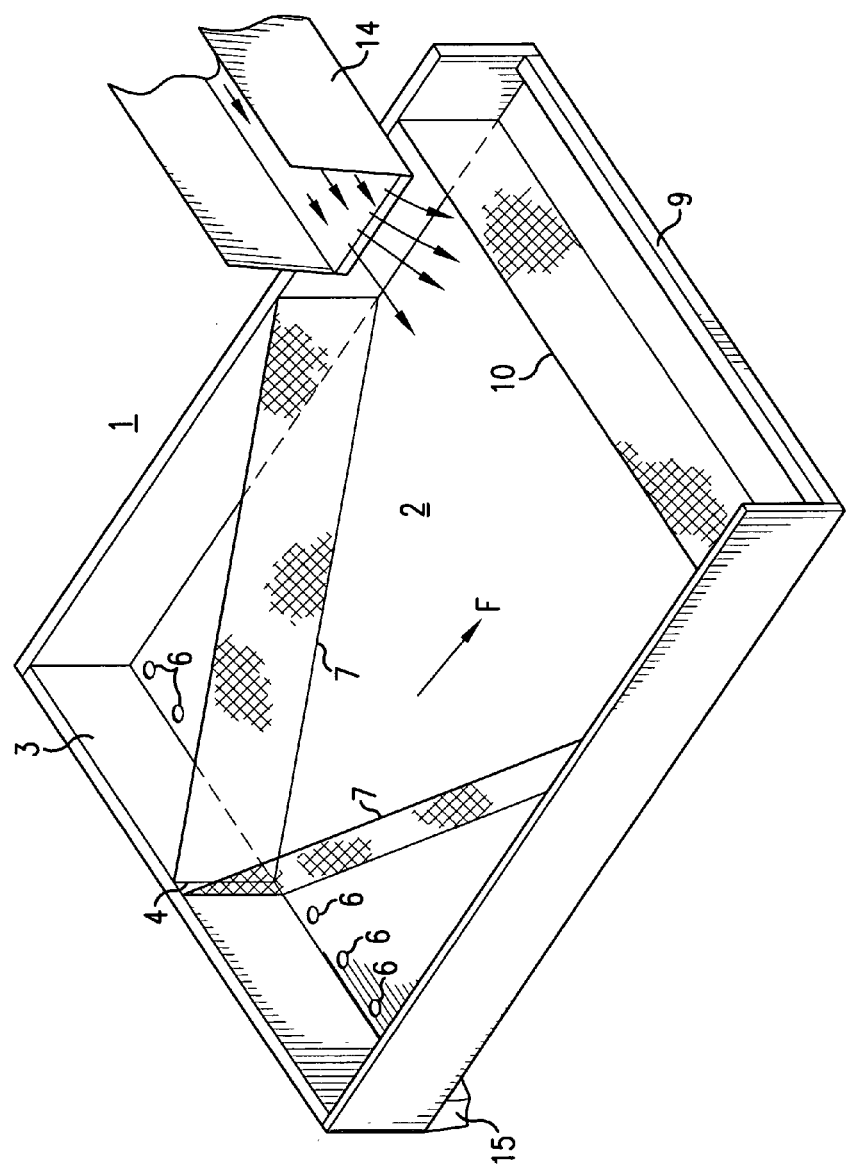
FIG. 1 is a diagram that illustrates a device for orienting live fish, in accordance with the prior art.
Figure 2:
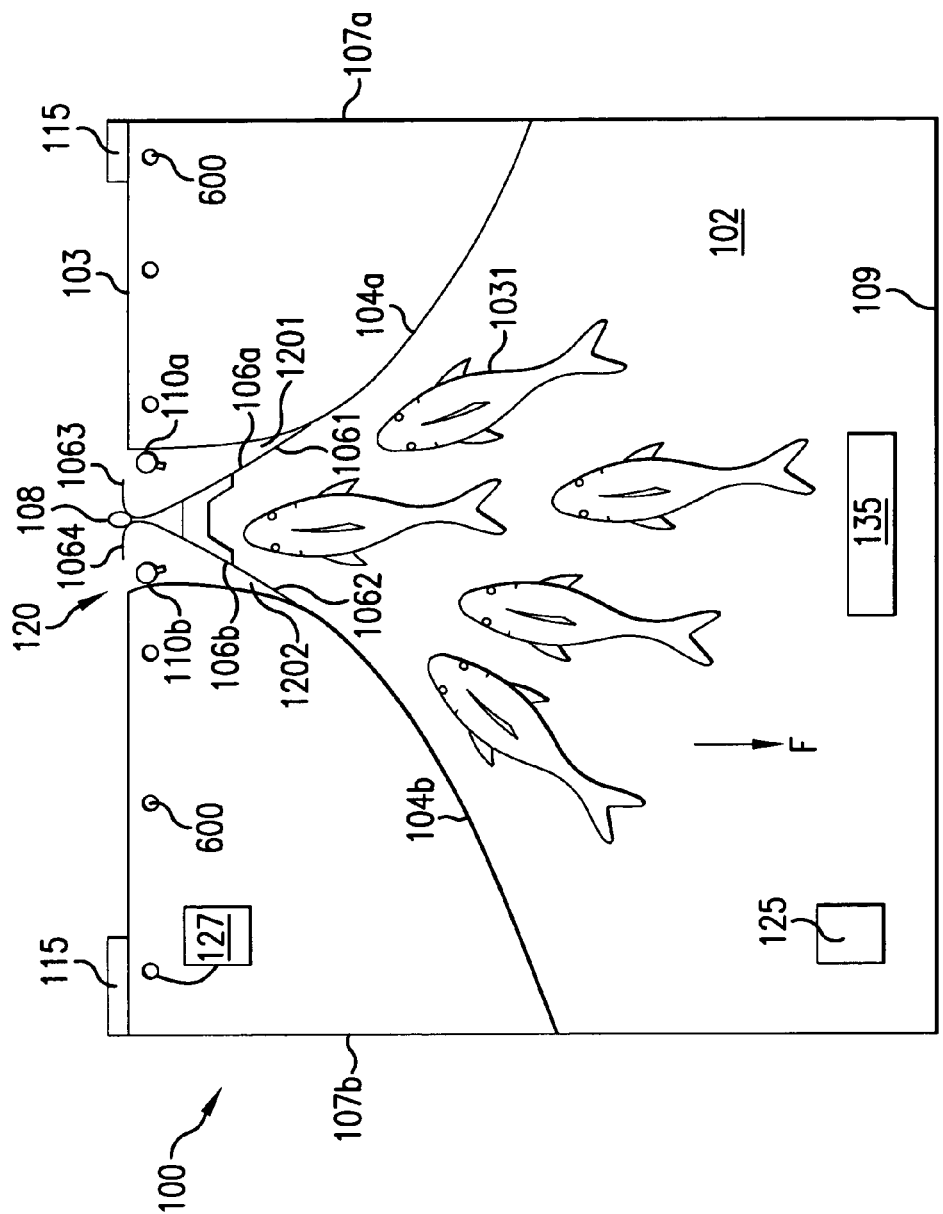
FIG. 2 is a top view of a device for separating live fish, in accordance with one embodiment of the present invention.

FIG. 2 is a schematic diagram of a fish flow control system 100, according to one embodiment of the present invention, that separates fish 1031. The fish flow control system 100 may be employed to separate fish that are moving through an exit aperture of a fish containing vessel, like the fish containing vessel illustrated in FIG. 1. More specifically, FIG. 2 illustrates a fish-containing vessel 102 that is filled with water containing fish 1031. The fish-containing vessel 102 has an apertured end 103 that has an exit aperture 120, an opposite end 109, and two side walls 107a, 107b. The fish-containing vessel 102 also has two vessel side walls 104a and 104b, that may be composed of a mesh or other material that allows water to flow therethrough, and that converge in the vicinity of the exit aperture 120. Alternatively, the two vessel side walls 104a and 104b may be composed of a solid material that does not allow water to flow therethrough. Preferably, the exit aperture 120 is large enough to allow passage therethrough by the largest size fish that may be contained in the fish-containing vessel 102.

In one embodiment, positioned within or immediately adjacent to the exit aperture 120 is a gate 106. In the embodiment shown, the gate 106 includes a pair of pivotable gate portions 106a, 106b, each of which is connected at a first end 1061, 1062 to a respective vessel side wall 104a, 104b and which is free to move, e.g., to be moved by a fish, at a second end 1063, 1064. In one embodiment, the second ends 1063, 1064 of the first and second gate portions 106a, 106b are curved so as to minimize the likelihood of harming a fish that is moving therebetween. Preferably, each of the pivotable gate portions 106a, 106b is comprised of an array of wires, e.g., 0.010" stainless steel wires, that are compliant enough to allow a fish to push through the gate but which is rigid enough to prevent or at least discourage more than one fish from pushing through the gate simultaneously. In one embodiment, the second end 1063 of the first pivotable gate portion 106a is maintained adjacent to the second end 1064 of the second pivotable gate portion 106b when the first and second pivotable gate portions 106a, 106b are in a resting, e.g., normally closed, position. Of course it is recognized that, while the embodiment of the present invention shown in FIG. 2 illustrates two pivotable gate portion 106a, 106b that are connected to respective vessel side walls 104a, 104b, other embodiments of the present invention may not have a gate. Alternatively, other embodiments may employ a single pivotable gate that is connected at its first end to a first vessel side wall and that has a second end that, in its resting position, is adjacent to a second vessel side wall.

Referring again to FIG. 2, located on opposite sides of the exit aperture 120 are first and second jet devices 110a, 110b. Specifically, a first jet device 110a is located in the exit aperture 120 in the space 1201 between the first vessel side wall 104a and the first pivotable gate portion 106a. Similarly, a second jet device 110a is located in the exit aperture 120 in the space 1202 between the second-vessel side wall 104b and the second pivotable gate portion 106b. The first and second jet devices 110a, 110b are configured to spray a jet, such as a jet of water, air, etc., out of the exit aperture 120 and into the fish-containing vessel 102 in a direction towards the fish 1031. In the preferred embodiment, in which each of the pivotable gate portions 106a, 106b is made of an array of compliant stainless steel wires, the first and second jet devices 110a, 110b are configured to spray a jet into the fish-containing vessel 102 through the wires of the first and second pivotable gate portions 106a, 106b. In this embodiment, the wires of the first and second pivotable gate portions 106a, 106b are thin enough and adequately spaced apart so as to minimally interfere with the jet spraying therethrough. Advantageously, the compliant stainless steel wires of the pivotable gate portions 106a, 106b center the fish 1031 between the first and second jet devices 110a, 110b so as to ensure that the fish 1031 is in an optimal position when the first and second jet devices 110a, 110b spray a jet out of the exit aperture 120 and into the fish-containing vessel 102 in a direction towards the fish 1031.

The fish flow control system 100 also includes a sensor 108. The sensor 108 is configured to sense the presence of a fish 1031. The sensor 108 may be any type of device that is capable of sensing the presence of a fish. In the preferred embodiment of the invention, the sensor 108 is located approximately adjacent to the free ends of the first and second pivotable gate portions 106a, 106b when the first and second pivotable gate portions 106a, 106b are in the resting, e.g., normally closed, position. In addition, the sensor 108 is configured to communicate with the first and second jet devices 110a, 110b such that, upon sensing the presence of a fish, the first and second jet devices 110a, 110b are caused to spray their respective jets out of the exit aperture 120 and into the fish-containing vessel 102. Other types or positions of the sensor 108 may also be used, provided that the sensor 108 is configured to cause the first and second jet devices 110a, 110b to spray their respective jets at an appropriate time, as further discussed below. For instance, in one embodiment, the sensor 108 may be incorporated as part of the gate 106, such that movement of the gate 106 provides the necessary indication that a fish is present.

The fish flow control system 100 may also include, according to one embodiment, a flow generation device 127 for generating a flow F in the water in the fish-containing vessel 102. Advantageously, the flow generation device 127 is configured to generate a flow in the water in the fish-containing vessel 102 in a direction away from the exit aperture 120. The degree of flow F away from the exit aperture 120 is preferably strong enough so that fish in the fish-containing vessel 102, and eventually moving through the exit aperture 120, are required to swim against the flow F in order to pass through the exit aperture 120, thereby providing that when fish exit the fish-containing vessel 102 through the exit aperture 120, they are in a head-first, dorsal-side-up orientation. Of course, the flow F should not be so strong as to prevent fish from exiting the fish-containing vessel 102 through the exit aperture 120 or to drive fish away from the apertured end 103. In one embodiment, the strength and volume of the flow F away from the apertured end 103 may be varied in accordance with the type of fish to be separated.

In one embodiment of the present invention, the flow generation device 127 includes a pump or the like which generates the flow F by introducing water into the fish-containing vessel 102 through the lower interior surface of the fish-containing vessel 102, the apertured end 103 of the fish-containing vessel 102, a vessel side wall 104a, 104b, from above the water in the fish-containing vessel 102, or any combination of these locations. Water may be pumped into the fish-containing vessel 102, or may be forced into the fish-containing vessel 102 by pressure or by gravity. In one embodiment of the invention, water is pumped into the fish-containing vessel 102 through flow apertures 600 located proximate to the apertured end 103 of the fish-containing vessel 102. Alternatively, water may be forced into the fish-containing vessel 102 through a portion of the exit aperture 120 or may be conveyed into the fish-containing vessel 102 through tubing or piping.

In another embodiment of the present invention, the flow generation device 127 also includes a device for slanting or tilting the fish-containing vessel 102. For instance, to facilitate the flow F of water in the vessel away from the exit aperture 120, the fish-containing vessel 102 may be slanted such that the depth of the water proximate to the exit aperture 120 is less than the average depth of the water in the fish-containing vessel 120. One method of slanting the fish-containing vessel 102 is to elevate the end of the vessel 102 proximate to the exit aperture 120 by placing, e.g., blocks 115, beneath the lower interior surface, or fixing an angled block or wedge to the lower exterior surface. In this embodiment, the flow F is stronger near the apertured end 103 of the fish-containing vessel 102, and weaker at the opposite end 109 of the fish-containing vessel 102. The flow F diminishes towards the opposite end 109 of the fish-containing vessel 102 because the depth of the water in the fish-containing vessel 102 increases towards the opposite end 109 of the fish-containing vessel 102. The weak flow at the opposite end 109 of the fish-containing vessel 102 helps decreases the likelihood that a fish 1031 will accidentally be washed over the wall at the opposite end 109 of the fish-containing vessel 102.

According to the embodiment of the present invention wherein the lower interior surface of the vessel 102 is tilted by placing blocks 115 underneath the lower interior surface opposite the apertured end 103, the deeper water proximate to the exit aperture 120 may encourage fish to swim towards the exit aperture 120. In order to provide adequate flow towards the opposite end 109 of the fish containing vessel 102 located opposite the apertured end 103, particularly in those embodiments in which the two vessel side walls 104a and 104b are composed of a solid material that does not allow water to flow therethrough, the fish containing vessel 102 may provide a space between the bottom edge of the two vessel side walls 104a, 104b and the lower interior surface of the fish containing vessel 102. According to one such embodiment, the space between the bottom edge of the two vessel side walls 104a, 104b and the lower interior surface of the fish containing vessel 102 is largest adjacent to the exit aperture 120 and decreases towards the outer side walls 107a, 107b. In this manner, the current gradient may remain largest in the vicinity of the exit aperture 120.

The fish flow control system 100 may also include, according to one embodiment thereof, a fish stimulation device 125 for stimulating the fish 1031 in the fish-containing vessel 102. Advantageously, the fish stimulation device 125 is configured to stimulate the fish 103 to move in the fish-containing vessel 102 in a direction towards the exit aperture 120 and to exit through the exit aperture 120. The fish stimulation device 125 may include one or both of a means for providing positive stimulation, e.g., any type of stimulation that attracts a fish, and a means for providing negative stimulation, e.g., any type of stimulation that repels a fish. For instance, in accordance with one embodiment of the present invention, the fish stimulation device 125 creates an environment within the fish-containing vessel 102 that is uncomfortable to fish, thereby causing the fish to seek a way out of the fish-containing vessel 102. For instance, the fish stimulation device 125 may include a light, for illuminating the water of the fish-containing vessel 102 or for illuminating the lower interior surface of the fish-containing vessel 102. The light, because it typically makes fish feel vulnerable to predators, encourages the fish to leave the brightly-lit area.

In addition, the fish stimulation device 125 may include an acoustic device, e.g., a speaker or the like, for introducing sound waves into the water of the fish-containing vessel 120. Still further, the fish stimulation device 125 may include an oscillator or other vibrational device for introducing vibrations or shock waves into the water of the fish-containing vessel 102. In addition, the fish stimulation device 125 may include an odorous device for generating an odor in the water of the fish-containing vessel 102. Also, the fish stimulation device 125 may include a chemical device for introducing chemicals into the water of the fish-containing vessel 102, e.g., by placing salt, shark repellent, or citric acid in the water of the fish-containing vessel 102. Still further, the fish stimulation device 125 may include an electrical device for creating an electric current in the water of the vessel 102, e.g., by placing an anode proximate to the exit aperture 120 and a cathode proximate to the side 109 opposite the apertured side 103 and running a current between the anode and cathode. In addition, the fish stimulation device 125 may include visual stimuli visible to the fish, e.g., models or pictures of predators proximate to the side 109 of the fish-containing vessel 102 opposite the apertured side 103. The present invention may also include any combination of the above-described fish stimulation devices 125 or may include none at all.

In another embodiment of the present invention, the fish stimulation device 125 may include a system for creating and/or maintaining a crowded environment within the fish-containing vessel 102 such that the number of fish per square foot of swimmable water surface area in the fish-containing vessel 102 is larger than a number with which the fish are instinctively comfortable. For instance, a crowded environment within the fish-containing vessel 102 may be created by introducing fish 1031 into the fish-containing vessel 102 at a predetermined rate. Preferably, the number of fish per square foot of swimmable water surface area is kept as high as possible, provided that the fish flow control system 100 continues to function properly. In another embodiment of the present invention, the fish stimulation device 125 may include a system for creating and/or maintaining a shallow environment within the fish-containing vessel 102. For instance, in one embodiment, the average depth of the water in the fish-containing vessel 102 and/or depth of the water at the exit aperture 120 is less than twice the average height of the fish to be separated so as to ensure that two fish cannot exit the fish-containing vessel 102 through the exit aperture 120 at the same time by having one fish swim above the other. The fish flow control system may employ a depth control feature to control the depth of the water in the fish-containing vessel 102.

It is also noted that the fish stimulation device 125 may encompass the first and second jet devices 110a, 110b. For instance, the first and second jet devices 110a, 110b may provide positive stimulation, e.g., may attract the fish 1031 towards the exit aperture 120. This occurs due to the inclination of the fish 1031 to swim towards the agitated water that is generated by the first and second jet devices 110a, 110b.

Figure 6:
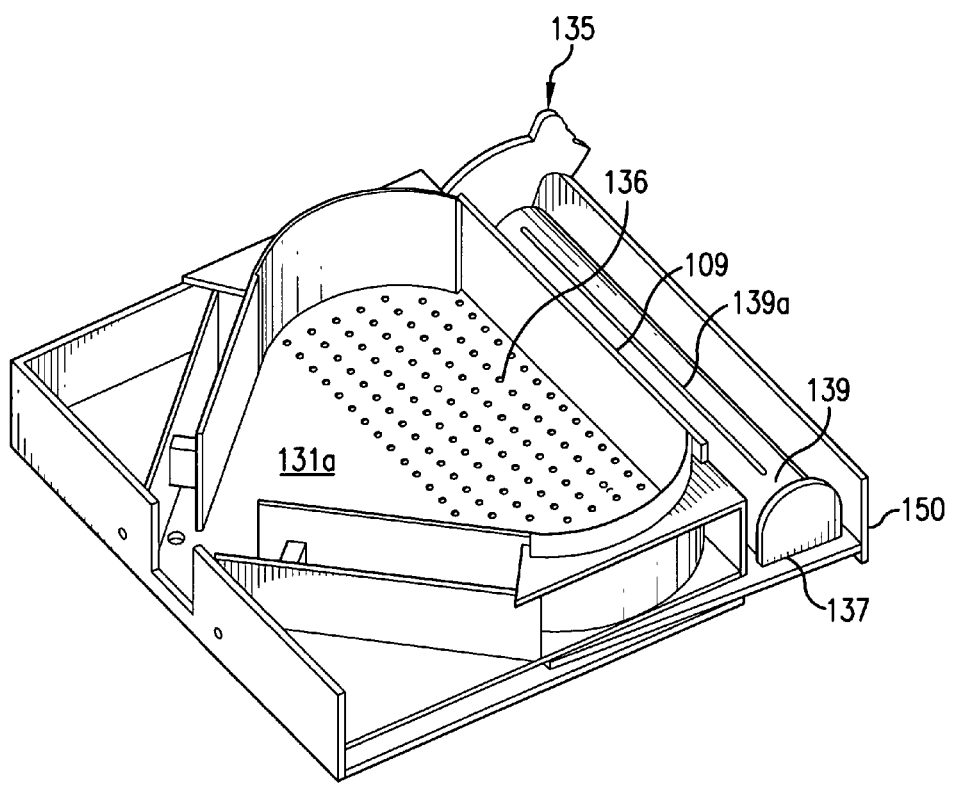
FIG. 6 is a perspective, partially cut-away view of a fish flow control device including a water level regulation device, according to one embodiment of the present invention.

The fish flow control system 100 may also include, according to one embodiment thereof, a water level regulation device 135 for regulating the level of the water in the fish containing vessel 102. Regulating the level of the water in the fish containing vessel 102 may ensure consistent operation of the first and second jet devices 110a, 110b, e.g., may ensure that the jet devices spray their respective jets with an equal amount of force each time. FIG. 6 is a perspective, partially cut-away view of a fish flow control device 100 that illustrates various features of a water level regulation device 135 for regulating the level of the water in the fish containing vessel 102, according to one embodiment of the present invention. For instance, the water level regulation device 135 may include perforations 136 through a lower interior surface 131a of the fish containing vessel 102. In addition, the fish flow control device 100 may include an adjustable water level mechanism 137. The adjustable water level mechanism 137, in the embodiment shown, is housed in a secondary chamber 150 that is separate from but in fluid communication with the fish containing vessel 102. The adjustable water level mechanism 137 includes an adjustable water outlet, in this case a rotatable pipe 139 that is housed within the secondary chamber 150. The rotatable pipe 139 has an orifice, e.g., a longitudinal slit 139a extending along the outer wall of the rotatable pipe 139, through which water may exit the secondary chamber 150. In operation, water flows through the perforations 136 of the lower interior surface 131a of the fish containing vessel 102 and into the secondary chamber 150. Since the fish containing vessel 102 and the secondary chamber 150 are in fluid communication with each other via the perforations 136, the water level in the fish containing vessel 102 is the same as the water level in the secondary chamber 150. In order to adjust the water level in the secondary chamber 150, and consequently in the fish containing vessel 102 also, the rotatable pipe 139 is rotated so as to change the position, e.g., the relative height, of the longitudinal slit 139a. For instance, if the rotatable pipe 139 is rotated such that the longitudinal slit 139a is positioned at the top of the rotatable pipe 139, then the water level in the fish containing vessel 102 and the secondary chamber 150 will both be maintained at the highest possible level. The water level in the fish containing vessel 102 and the secondary chamber 150 may be lowered by rotating the rotatable pipe 139 so that the longitudinal slit 139a is positioned at a lower relative height. Thus, the level of the water in the fish containing vessel 102 can be regulated by adjustment of the adjustable water level mechanism 137 in the secondary chamber 150. The present invention contemplates that the adjustment of the adjustable water level mechanism 137 may be accomplished either manually, e.g., by an operator, or automatically, e.g., by sensors or the like that detect the water level. While FIG. 6 illustrates a water regulation device 135 in accordance with one embodiment of the present invention, it should be recognized that any other mechanism or combination of mechanisms for regulating the level of the water in the fish containing vessel 102, e.g., level sensors, pumps, drains, etc. may be employed. The embodiment illustrated in FIG. 6 provides the advantage that stressed or lethargic fish are not pinned to the opposite, e.g., rear, end 109 of the fish containing vessel 102, because the water exits the fish containing vessel 102 through the perforations 136 in the lower interior surface 131a of the fish containing vessel 102 rather than through or over the rear end 109.

Figure 3:
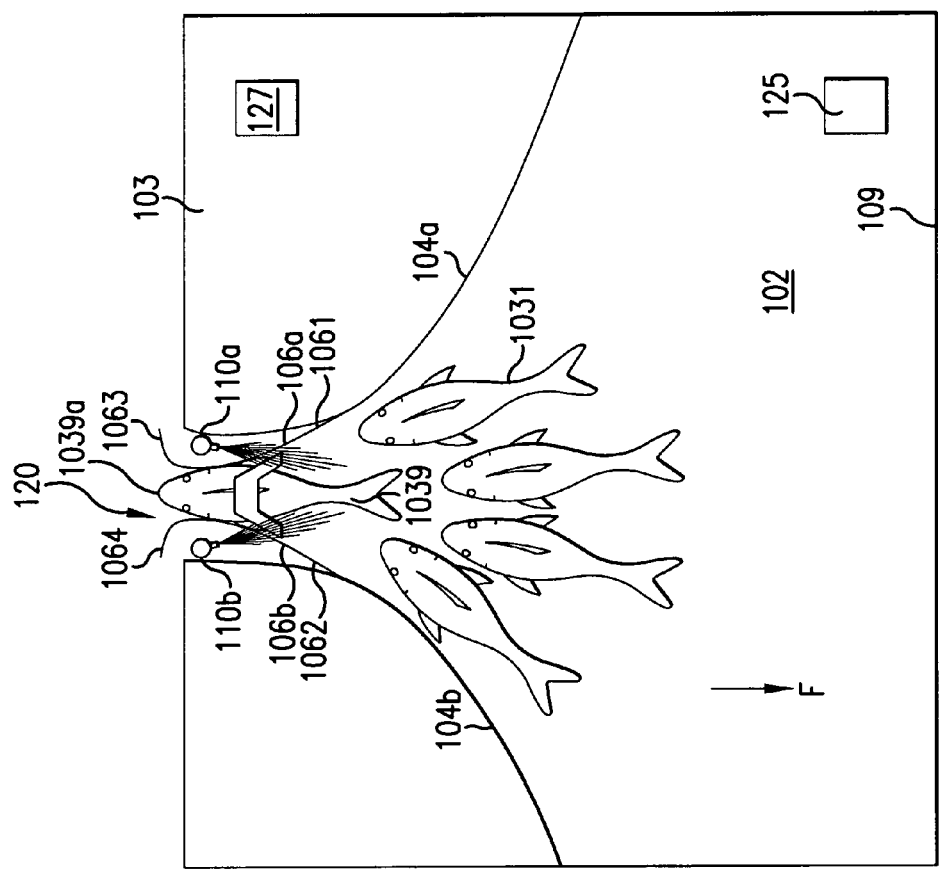
FIG. 3 illustrates the operation of the device for separating live fish, according to the embodiment of the present invention illustrated in FIG. 2.

FIG. 3 is a schematic diagram of the fish flow control system 100, according to one embodiment of the present invention, showing in part the operation of the fish flow control system 100. Specifically, FIG. 3 illustrates the fish flow control system 100 when one fish 1039 of a plurality of fish 1031 is moving through the exit aperture 120 of the fish containing vessel 102. The first fish 1039 pushes through the first and second pivotable gate portions 106a, 106b which as discussed previously is compliant enough to allow passage of the fish 1039. The free ends of the first and second pivotable gate portions 106a, 106b are caused to separate from each other but remain in contact with the sides of the fish 1039 as the fish 1039 is passing through the first and second pivotable gate portions 106a, 106b. This contact of the first and second pivotable gate portions 106a, 106b with the sides of the fish 1039 help minimize the likelihood that another fish 1031 will simultaneously pass through the first and second pivotable gate portions 106a, 106b.

As shown in FIG. 3, as the forward-most end 1039a of the first fish 1039 moves through the first and second pivotable gate portions 106a, 106b, the forward-most end 1039a of the first fish 1039 contacts, or activates in any other manner, the sensor 108 (the sensor 108 is shown in FIG. 3 as hidden beneath the forward-most end 1039a of the first fish 1039). The sensor 108, upon sensing the presence of the first fish 1039, communicates with the first and second jet devices 110a, 110b to cause the first and second jet devices 110a, 110b to spray their respective jets into the fish-containing vessel 102. In the preferred embodiment of the invention, the first and second jet devices 110a, 110b are oriented so that their jets spray through the first and second pivotable gate portions 106a, 106b, respectively, along the sides of the first fish 1039 and towards the region directly behind the first fish 1039. In this configuration, the sensor 108, the first and second pivotable gate portions 106a, 106b, and the first and second jet devices 110a, 100b are positioned relative to each other such that, upon the sensor 108 sensing the presence of the first fish 1039, the first fish 1039 has at least partially passed between the first and second pivotable gate portions 106a, 106b. Thus, when the first and second jet devices 110a, 110b are caused to spray their respective jets, the first fish 1039 has moved a sufficient distance between the first and second pivotable gate portions 106a, 106b such that the first fish 1039 is not pushed back or discouraged from continuing to move forward between the first and second pivotable gate portions 106a, 106b. Instead, when the first and second jet devices 110a, 110b are caused to spray their respective jets, the jets from the first and second jet devices 110a, 110b are sprayed towards the remaining fish 1031 in the fish-containing vessel 102 so as to prevent or at least discourage the remaining fish 1031 from moving between the first and second pivotable gate portions 106a, 106b.

According to one embodiment of the present invention, the first and second jet devices 110a, 110b are configured to spray the jet until the sensor 108 senses that the first fish 1039 has moved fully through the exit aperture 120, e.g., when the sensor 108 senses that the rear-most portion of the first fish 1039 has moved past the sensor 108. At this point, the sensor 108 may communicate with the first and second jet devices 110a, 110b so as to discontinue spraying the jets until another fish 1031 is sensed in the exit aperture 120. In another embodiment, the first and second jet devices 110a, 110b are configured to spray the jet for an additional predetermined amount of time after the sensor 108 senses that the first fish 1039 has moved fully through the exit aperture 120. In still another embodiment of the present invention, the first and second jet devices 110a, 110b are configured to spray the jet for a predetermined period of time after sensing that the forward-most portion 1039a of the first fish 1039 is in the exit aperture 120.

The present invention may be used in various different ways. For instance, the fish flow control system 100 may be used to provide spacing between fish. The jets sprayed by the first and second jet devices 110a, 110b are thus used to push backwards, or at least discourage the forward movement of, all but a first fish, such as the first fish 1039, as the fish are attempting to move single file through the exit aperture 120 of the fish-containing vessel 102. Because the gate 106, according to one embodiment of the present invention, may be compliant, various sizes of fish may be controlled by the fish flow control system 100—thus, the fish 1031 may be sorted or unsorted. An arrangement of this type is advantageous for operations that require a high throughput, such as sorting or counting.

Figure 4:
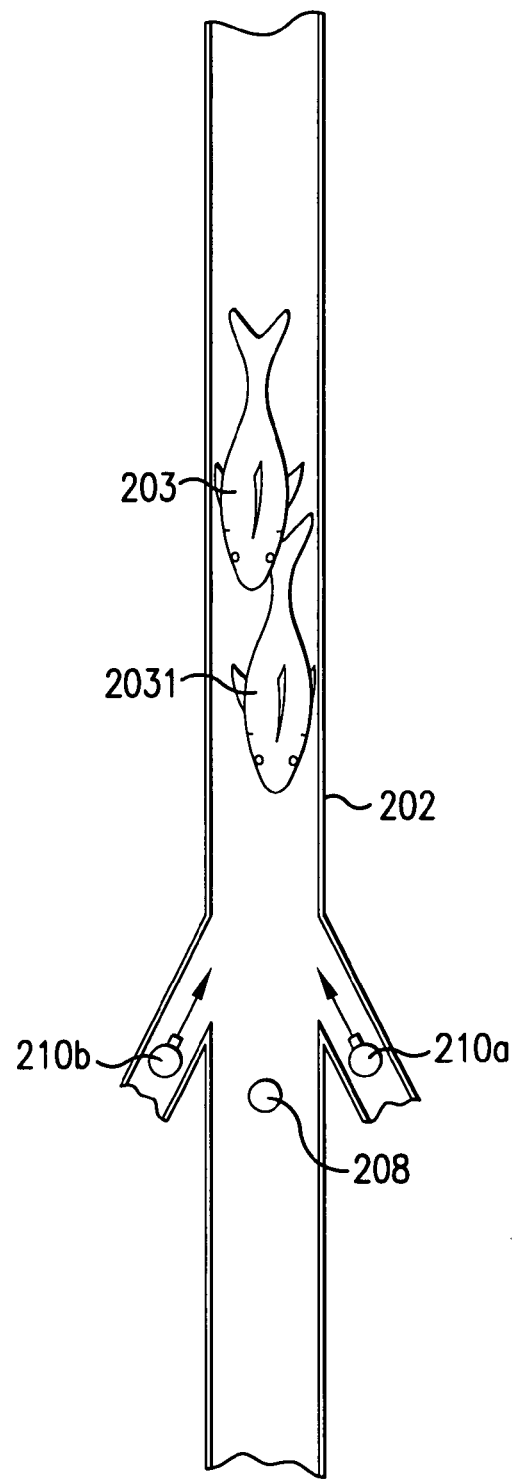
FIGS. 4 and 5 illustrate a device for providing single fish for additional processing upon demand, in accordance with another embodiment of the present invention.
Figure 5:
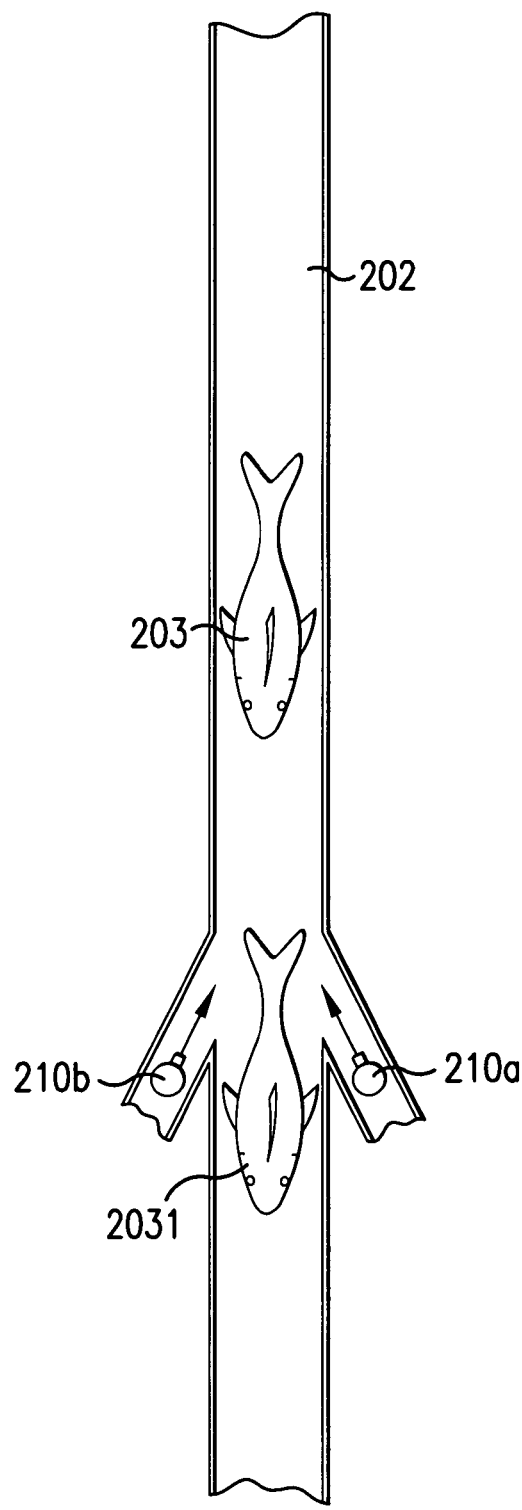

The fish flow control system 100 may also be used to provide a fish on demand. Advantageously, in this embodiment, the fish are already sorted, e.g, all of the fish in the fish-containing vessel 102 are of a similar size or type. FIGS. 4 and 5 illustrate an embodiment of the present invention in which fish are disposed in a tunnel such that a single fish may be provided for additional processing upon demand. FIG. 4 illustrates, in accordance with one embodiment of the present invention, pre-sorted fish 203 that are disposed in a relatively narrow tunnel 202. Advantageously, the width of the tunnel 202 is provided so as to cause the fish 203 to be arranged in a single file. Once arranged in a single file, the position of a first fish 2031 is controlled via closed-loop control of the water flow in the tunnel. Once a fish is demanded, the first fish 2031 is allowed to move forward within the tunnel 202. After the widest part of the first fish 2031 has past a predetermined point in the tunnel 202, first and second jet devices 210a, 210b spray a jet to push backwards, or at least discourage the forward movement of, a second fish swimming behind the first fish 2031. The first fish 2031 moves forward to be processed. The position of the second fish is then controlled via closed-loop control 208 of the water flow in the tunnel 202 until another fish is demanded. This embodiment has the advantage that a fish is always ready to be provided when a fish is demanded, making it particularly well-suited for processes such as tagging, vaccinating, etc.

Thus, the present invention, in accordance with various embodiments thereof, provides numerous advantages as compared to conventional fish flow control devices. For example, the fish flow control device of the present invention provides a system and method for ensuring adequate separation between fish as the fish are handled by a fish flow control device. In addition, the fish flow control device of the present invention provides a fish stimulation device 125 that is configured to stimulate the fish 1031 to move in the fish-containing vessel 102 in a direction towards the exit aperture 120 and to exit through the exit aperture 120. As mentioned previously, the fish stimulation device 125 may include positive fish stimulation means, e.g., a visual stimuli device, for attracting a fish and/or negative fish stimulation means, e.g., an illumination device, an acoustic device, a vibrational device, an odorous device, a chemical introduction device, an electrical device and/or a visual stimuli device, to repel a fish. In addition, the present invention provides positive stimulation in the form of the first and second jet devices 110a, 110b, which may attract the fish 1031 towards the exit aperture 120 by taking advantage of the inclination of the fish 1031 to swim towards agitated water that is generated by the first and second jet devices 110a, 110b. By providing this stimulation, the fish 1031 are drawn towards the exit aperture 120 and the throughput of the fish flow control system of the present invention may be increased. Furthermore, the fish flow control system 100 also has the advantage that the jets that are sprayed from the first and second jet devices 110a, 110b cause the water in the fish-containing vessel 102 to be circulated. Thus, stressed or lethargic fish 1031 in the fish-containing vessel 102 may be moved towards the apertured end 103 of the fish-containing vessel 102, thereby enticing them to exit the fish-containing vessel 102 through the exit aperture 120. This action may reduce the overall stress in the population of fish 1031 in the fish-containing vessel 102 as compared with a tranquil or stagnant vessel.

Thus, the several aforementioned objects and advantages of the present invention are most effectively attained. Those skilled in the art will appreciate that numerous modifications of the exemplary example embodiments described hereinabove may be made without departing from the spirit and scope of the invention. Although various exemplary example embodiments of the present invention have been described and disclosed in detail herein, it should be understood that this invention is in no sense limited thereby and that its scope is to be determined by that of the appended claims.

What is claimed is:

1. A system for controlling the flow of fish comprising:
a vessel containing water and having an exit aperture;
a sensor configured to sense a first fish moving through the exit aperture; and
a jet device having a jet wherein the jet device in communication with the sensor, the jet device positioned adjacent to the exit aperture and configured to activate a jet in response to the sensor sensing the first fish to prevent a second fish from moving through the exit aperture.

2. The system of claim 1, further comprising a gate positioned at the exit aperture, the gate being normally closed and configured to be pushed open by a fish moving through the exit aperture.

3. The system of claim 2, wherein the gate has one end attached to the vessel and a second end that is free to be moved by the fish.

4. The system of claim 3, wherein the sensor is positioned adjacent to the second end of the gate.

5. The system of claim 2, wherein the gate includes a pair of oppositely disposed gate portions.

6. The system of claim 2, wherein the gate includes a plurality of compliant wires.

7. The system of claim 6, wherein the compliant wires are made of stainless steel.

8. The system of claim 1, wherein the vessel includes a tunnel.

9. The system of claim 1, wherein the jet device is configured to spray the jet for a predetermined period of time.

10. The system of claim 1, further comprising a flow generation device for generating a flow in the vessel in a direction away from the exit aperture.

11. The system of claim 1, further comprising a fish stimulation device for stimulating fish in the vessel to move through the exit aperture.

12. The system of claim 11, wherein the fish stimulation device provides positive stimulation to attract fish in the vessel towards the exit aperture.

13. The system of claim 11, wherein the fish stimulation device includes the jet device.

14. The system of claim 11, wherein the fish stimulation device provides negative stimulation to repel fish in the vessel towards the exit aperture.

15. The system of claim 14, wherein the fish stimulation device includes at least one of an illumination device, an acoustic device, a vibrational device, an odorous device, a chemical introduction device, an electrical device and a visual stimuli.

16. The system of claim 1, wherein the system is configured to provide spacing between fish.

17. The system of claim 1, wherein the system is configured to provide a single fish on demand.

18. A system for controlling the flow of fish comprising:
a vessel containing water and having an exit aperture:
a sensor configured to sense a first fish moving through the exit aperture; and
a jet device having a jet wherein the jet device in communication with the sensor, the jet device positioned adjacent to the exit aperture and configured to spray a jet to prevent a second fish from moving through the exit aperture, wherein the jet device is configured to spray the jet until the sensor senses that the first fish has moved fully through the exit aperture.

19. A method for controlling the flow of fish in a vessel containing water and having an exit aperture, the method comprising the steps of:
sensing a first fish moving through the exit aperture;
activating a jet into the vessel upon sensing the first fish to prevent a second fish from moving through the exit aperture.

20. The method of claim 19, further comprising the step of disposing a gate at the exit aperture, the gate being normally closed and configured to be pushed open by a fish moving through the exit aperture.

21. The method of claim 20, wherein the disposing step includes attaching a first end of the gate to the vessel and allowing a second end to be free to be moved by the fish.

22. The method of claim 21, further comprising positioning the sensor adjacent to the second end of the gate.

23. The method of claim 20, wherein the disposing step includes disposing a pair of gate portions.

24. The method of claim 20, wherein the disposing step includes disposing a plurality of compliant wires.

25. The method of claim 24, wherein the disposing step includes disposing a plurality of compliant stainless steel wires.

26. The method of claim 19, wherein the method includes the step of disposing the fish in a tunnel.

27. The method of claim 19, further comprising the step of continuing to spray the jet for a predetermined period of time.

28. The method of claim 19, further comprising the step of generating a flow in the vessel in a direction away from the exit aperture.

29. The method of claim 19, further comprising the step of stimulating fish in the vessel to move through the exit aperture.

30. The method of claim 19, further comprising the step of providing spacing between fish.

31. The method of claim 19, further comprising the step of providing a single fish on demand.

32. A method for controlling the flow of fish in a vessel containing water and having an exit aperture, the method comprising the steps of:
sensing a first fish moving through the exit aperture;
spraying a jet into the vessel to prevent a second fish from moving through the exit aperture;
sensing that the first fish has moved fully through the exit aperture; and
in response, discontinuing the spraying of the jet until the sensor senses that another fish is moving through the exit aperture.

* * * * *